United States Patent [19]

Shepard

[11] Patent Number: 5,245,166
[45] Date of Patent: *Sep. 14, 1993

[54] METHOD OF PROCESSING A DOCUMENT CARRYING TWO KINDS OF INDICIA

[75] Inventor: David H. Shepard, Greenwich, Conn.

[73] Assignee: Cognitronics Imaging Systems, Inc., San Diego, Calif.

[*] Notice: The portion of the term of this patent subsequent to May 21, 2008 has been disclaimed.

[21] Appl. No.: 866,434

[22] Filed: Apr. 10, 1992

Related U.S. Application Data

[60] Continuation of Ser. No. 669,578, Mar. 14, 1991, abandoned, which is a division of Ser. No. 219,713, Jul. 15, 1988, Pat. No. 5,017,763, which is a division of Ser. No. 40,288, Apr. 20, 1987, Pat. No. 4,760,246.

[51] Int. Cl.5 .............................................. G06K 7/10
[52] U.S. Cl. .................................. 235/456; 235/454; 235/385
[58] Field of Search ............... 235/385, 432, 454, 456, 235/470, 471; 382/66, 67; 434/353

[56] References Cited

U.S. PATENT DOCUMENTS

| | | | |
|---|---|---|---|
| 3,578,953 | 5/1971 | Milford et al. | 235/454 |
| 3,806,871 | 4/1974 | Shepard | 382/66 |
| 3,820,067 | 6/1974 | Shepard | 382/66 |
| 4,219,736 | 8/1980 | Thibodeau | 382/67 |
| 4,259,329 | 3/1981 | Gokey et al. | 235/385 |
| 4,352,165 | 9/1982 | Hevenor, Jr. | 364/900 |
| 4,408,181 | 10/1983 | Nakayama | 235/375 |
| 4,419,740 | 12/1983 | Hevenor, Jr. | 364/900 |
| 4,445,194 | 4/1984 | Yamamoto | 364/900 |
| 4,985,863 | 1/1991 | Fujisawa et al. | 364/900 |
| 5,017,763 | 5/1991 | Shepard | 235/432 |
| 5,038,379 | 8/1991 | Sano | 382/1 |

*Primary Examiner*—F. L. Evans
*Attorney, Agent, or Firm*—Parmelee, Bollinger & Bramblett

[57] ABSTRACT

Apparatus for scanning answer sheets with a series of closely-spaced parallel scan lines to produce scan signals for spots closely-spaced along each scan line, thereby producing a rectilinear data array of binary (black/white) representations at the intersections of a rectangular coordinate grid. Marks on the answer sheet are detected and processed to develop and print-out a score for the examinee by means of a dot-matrix printer. Scan spot signals representing the examinee's name written in prior to the test are used to directly control the dot-matrix printer to reproduce the examinee's name. The scan spot signals representing the name are stored with and physically accompany the test results, so that at any time the score data can be printed out together with the examinee's name.

7 Claims, 2 Drawing Sheets

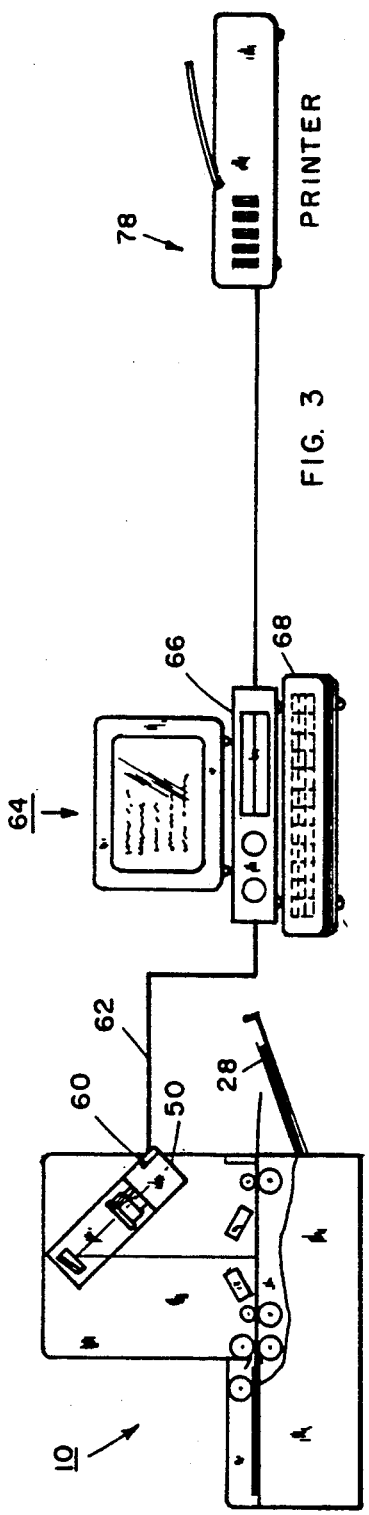

METHOD OF PROCESSING A DOCUMENT CARRYING TWO KINDS OF INDICIA

This application is a continuation of application Ser. No. 669,578 filed Mar. 14, 1991, now abandoned, which is a divisional of application Ser. No. 219,713 filed Jul. 15, 1988, now U.S. Pat. No. 5,017,763 which is a divisional of application Ser. No. 040,288 originally filed on Apr. 20, 1987, now U.S. Pat. No. 4,760,246.

BACKGROUND OF THE INVENTION

1. Field of the Invention

This invention relates to mark reading systems for reading multiple-choice answer sheets, for example of the type used for student testing.

2. Description of the Prior Art

There now is widespread use of pre-printed mark/read answer sheets presenting multiple-choice questions together with corresponding boxes in which the testor/examinee selectively enters a mark to indicate his/her chosen answer. Completed sheets are scanned by automatic optical mark reading (OMR) apparatus which determines which boxed area has been marked for each question. There are many prior patent references describing such automatic apparatus; see for example U.S. Pat. Nos. 3,800,430 and 4,219,736. The signals from the scanning apparatus are processed by conventional means such as a computer to calculate a number representing the testor's performance. Individual performances can also be compared with the computer-calculated average or norm of a group taking the test, or with regional or national performance norms, to produce a final comprehensive report for each examinee. The test data for each examinee typically will be stored for possible re-analysis.

It will be understood from the above description that the identity of the examinee must be established directly on the answer sheet so that the correspondence between the examinee and the test results will be assured. To that end, answer sheets commonly used heretofore are provided with a number of vertical columns of so-called "bubbles", which are circular mark-entry regions, wherein the "bubbles" of any one column correspond to and are identified with respective letters of the alphabet. The examinee enters his name, as by printing the letters horizontally above the bubble columns respectively, and additionally spells out his name by inserting a mark in the column directly beneath. Thus, for the name "John Smith" marks will be entered in (1) the "J" bubble of the first column, (2) the "o" bubble of the next column, (3) the "h" bubble of the third column, and so on. When the answer sheet is scanned by the mark reader, the marks entered in these bubbles are detected, and corresponding data is entered in the computer to represent the examinee's name.

Although this "bubble" entry arrangement gives correct results, it has a number of disadvantages. One problem is that the bubble columns occupy a very large portion of the available space of the answer sheet, limiting the area which can be committed to the test questions. Also, entering the individual letters of a name is very time-consuming. This factor is particularly detrimental when students' names must be entered by administrative personnel or by teacher, e.g. in cases where the students are quite young. Accordingly, there has developed a need to avoid the disadvantages of the "bubble" data entry scheme used heretofore.

SUMMARY OF THE INVENTION

In a preferred embodiment of the invention, to be described hereinbelow in detail, the answer sheet is provided with areas for the examinee to enter his/her name in writing, e.g. by printing the alphabetic letters of the name in side-by-side spaces shown on a horizontal line. No "bubble" columns are provided beneath the spaces for the letters of the name. Additional spaces may, however, be provided for the entry of further letters or numerals to indicate such information as the school grade, teacher's name, date, and so on.

In the described embodiment, the answer sheet is scanned by what is in basic respects conventional apparatus. This apparatus illuminates the answer sheet and optically examines all of the areas of interest on the sheet (including the inserted examinee's name) by making a series of closely-spaced parallel lateral scans across the width of the answer sheet. For example, the scan lines may be spaced about 0.016" apart along the longitudinal dimension of the answer sheet. The scanning apparatus develops scan signals representing the amount of light reflected from each of a series of closely-spaced spot positions along each lateral (horizontal) scan line. For example, the scan spots may be spaced about 0.016" apart across the sheet.

These scan-spot signals are processed to produce corresponding spot data signals indicating whether or not each such spot contains an element of an entered mark or character. These spot signals together constitute a rectilinear data array presenting binary black/white representations at the intersections of a rectangular coordinate grid. (Shepard U.S. Pat. No. 3,582,884 shows OCR apparatus which develops such spot-signal data arrays.) In the preferred embodiment, there is equal spacing between the black/white signals both horizontally and vertically, thereby to establish the geometric outlines of the marks and characters entered by the examinee.

The marks detected by the scanning apparatus are processed in the usual fashion, as by means of a programmed PC computer, to develop a score for the examinee. This score is printed out by the PC printer for use by the test administration personnel. The processed scan data is stored for possible re-analysis, or any other purpose.

The scan spot data signals representing the letter characters of the examinee's name (and any other alphanumeric character information entered therewith) is stored with the mark data, e.g. on a diskette of the type used with a conventional PC. When the mark data is processed and the results printed out by the PC printer, the PC program simultaneously reads out the stored spot data signals for the entered characters, and, by known program steps, causes the printer to print out the examinee's name and other selected information in dot matrix format. This dot-matrix print-out is in effect a direct reproduction of the characters as entered by the examinee before taking the test. That is, the processor does not make a determination of the individual characters, as in the prior art bubble column scheme.

The scan-spot data signals for the examinee's name information remain on the diskette (or other storage medium) together with the mark-scan data signals, and thus can be extracted with the test data at any later time if needed. Correspondence between the name data and the test results will always be maintained because the name data always physically accompanies the mark-scan test data.

Other objects, aspects and advantages of the invention will in part be pointed out in, and in part apparent from, the following detailed description of a preferred embodiment of the invention, considered together with the accompanying drawings.

BRIEF DESCRIPTION OF THE DRAWINGS

FIG. 3 is a diagrammatic showing of a complete system for carrying out the invention;

FIG. 4 shows part of an exemplary answer sheet; and

FIG. 5 shows a print-out of the results of processing answer sheets such as in FIG. 4.

DESCRIPTION OF A PREFERRED EMBODIMENT

Figure 1:
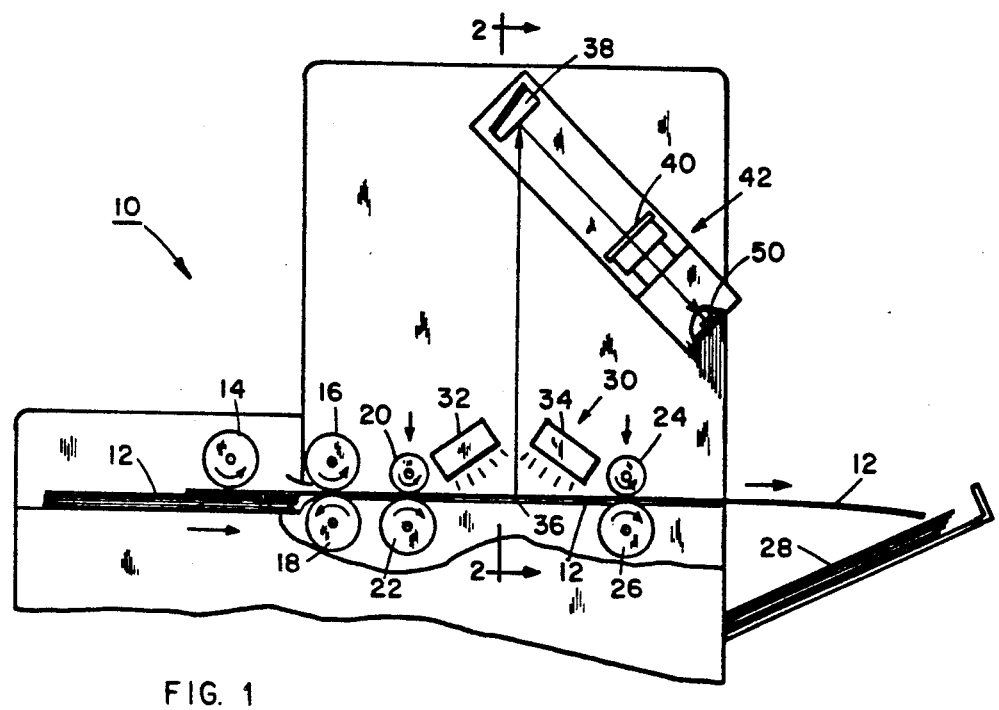
FIG. 1 is an elevation view of mark-scanning apparatus.

Referring first to FIG. 1, there is shown an optical mark reader (OMR) 10 suitable for use with the present invention. At the left-hand side of the machine there is a stack of answer sheets 12 to be scanned. A set of rollers 14–26 advances the sheets singly and sequentially through the machine. The first lower roller 18 may be reversely driven to prevent feeding two sheets together. The next two lower rollers 22 and 26 are feed rollers, with pressure rollers 20 and 24 above the sheet advance line. The answer sheets 12 exit to the right, into a finished stack 28.

Figure 2:
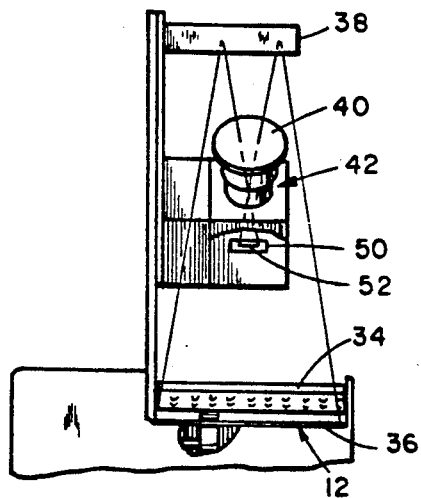
FIG. 2 is a view taken along line 2—2 of FIG. 1.

In the central region of the OMR 10, the sheets 12 are illuminated by a source of light 30. In this embodiment, the source comprises two side-by-side units 32, 34 each carrying light-emitting diodes producing infrared radiation. The reflected radiation which is directed vertically upwards from a central horizontal line 36 extending laterally across the sheet 12 strikes an angled plane mirror 38 (see also FIG. 2) and is directed down through an infra-red filter 40 and lenses 42 to a sensor 50 which produces data signals representing the amount of light received.

The sensor 50 is a conventional device of the type known as a linear array. It is an integrated circuit (IC) comprising a line of tiny light detectors (e.g. each about 0.0002" square) each producing an output signal proportional to the amount of incident light it receives. In the present embodiment, there are 512 active detectors along a line 52 about one-half inch in length, so that the spacing between individual detectors is about 0.001". At any given instant, each of these detectors produces an output signal representing the amount of radiation reflected from a corresponding spot along the horizontal line 36 across the answer sheet 12 then being illuminated by the light source 30. Since the answer sheet is approximately 8¼ inches in width, the spacing between the corresponding spots along this horizontal line is about 0.016".

The output signals of the individual detectors of the sensor 50 indicate by their amplitude whether the corresponding spot on the answer sheet contains an element of a mark or a character entered by the student. The detector output signals are read out sequentially in known fashion, by conventional electronic means. This read out is repetitive and carried out at high speed. With the advancing movement of the sheet 12, the result is that each sheet is scanned in a series of closely-spaced horizontal (lateral) scan lines. In the preferred embodiment, these scan lines were spaced about 0.016" apart.

The detector outputs during each scan across the sheet are directed to respective storage elements (not shown). The signals are processed, either before or after storage, to produce final spot data signals each indicating whether or not the corresponding spot on the answer sheet 12 contains an element of a character or mark.

The entire answer sheet is scanned in the above fashion, i.e. by scanning a series of closely-spaced lateral lines each extending across the width of the sheet. The scan lines preferably are spaced apart approximately the same distance as the inter-spot spacing along the scan lines, e.g. 0.016". The processed spot data signals together thus constitute a rectilinear data array of binary signals representing the presence or absence of character-or-mark elements at the intersections of a rectangular coordinate grid. (Because the sheets 12 continue to advance during the scanning operation, the scan lines will not be exactly perpendicular to the longitudinal dimension of the sheet; however, it is close enough to perpendicular that the co-ordinate grid of black/white binary signals can be considered to be rectangular.)

Referring now to FIG. 3, the processed spot data signals developed by the sensor 50 are stored as binary black/white signals in electronic storage means generally indicated at 60. From there, the spot data signals are directed through a line 62 to a computer 64 such as a conventional PC (personal computer) having the usual operating module 66 and keyboard 68. The PC is programmed in known fashion to store the data signals in memory, such as on a diskette.

FIG. 4 shows the upper portion of an answer sheet for carrying out the present invention. At the top, the student enters his name in side-by-side boxes 70. Other sets of boxes are provided for additional character entries, such as for the teacher's name at 72. The boxes and other indicia are pre-printed on the sheet in red color. A lead pencil is used to enter the student's name and to make the marks in the answer portion 74 of the sheet.

The PC 64 is programmed in known fashion to process the data signals from the regions of the sheet containing marks entered by the examinee (e.g. as at 74) so as to determine which boxes on the answer sheet were marked. From that determination, the PC calculates in the usual way the score data for each particular examinee, and stores it in diskette memory.

The PC 64 also is programmed in generally known fashion to utilize the data signals from the character-bearing regions (70, 72) of the answer sheet to control the printer 78 associated with the PC. This printer is of the dot-matrix type, wherein each character is formed by printing dots in selected positions of a substantially rectilinear matrix. It will be seen that the scan spot data signals developed by the reader 10 are essentially of dot-matrix format. Therefore, these data signals can be used directly to control the printer 78 so as in effect to make a direct reproduction of the characters entered by the examinee in the boxes 70, 72. Such reproduction is illustrated at 80, 82 in the print-out shown in FIG. 5.

The printer 78 may for example be of the type capable of printing a matrix which is 8 dots (or pixels) high. By employing two passes of the printer, one directly beneath the other, characters of 16 pixels, one-quarter inch total height, can be created, thus matching the usual one-quarter inch height of the character-entry boxes printed on the answer sheet as at 70, 72.

The printer 78 also will, under known program control by the PC 68, print out in columns of the form shown in FIG. 5 the results of the calculations of the student's score, and any other appropriate calculations, opposite the students' names.

The PC 64 is able to discriminate between the rows 70, 72 of the sheet 12 carrying alphabetic characters, and the rows 74 carrying spaces to be marked, by the use of clock marks 90 along the right-hand edge of the sheet. These marks are detected by the OMR 10 and are analyzed by the computer to determine whether the scan data in the adjacent corresponding row constitutes images to be directly reproduced on the print-out (as at 80, 82), or whether the data represents marks which are to be analyzed to develop score information or other statistical data to be printed out in the data columns of the sheet. Use of such clock marks for answer sheet processing control is well known in the art, as shown for example in U.S. Pat. No. 3,900,961.

Although a specific preferred embodiment of this invention has been described hereinabove in detail, it is desired to emphasize that this has been for the purpose of illustrating the invention, and should not be considered as necessarily limitative of the invention, it being understood that many modifications can be made by those skilled in the art while still practicing the invention claimed herein.

What is claimed is:

1. The method of processing a document carrying two different kinds of information-bearing indicia; said method comprising the steps of:
    scanning the document with a closely-spaced and uniformly-spaced series of parallel scan lines to produce corresponding scan data signals;
    producing binary scan spot signals representing the presence or absence of indicia elements at closely-spaced and uniformly-spaced point along each scan line;
    storing said scan spot data signals;
    processing the scan spot data signals representing one of said kinds of indicia to produce corresponding processed data signals;
    storing said processed data signals;
    said processed data signals and said scan spot data signals being stored so as to provide that (1) the processed data signals can be read out and (2) at least a portion of the stored scans spot data signals can be read out to produce an image reproduction of unprocessed indicia.

2. The method of claim 1, wherein said binary scan spot data signals are developed to represent a rectilinear data array of binary signals identifying the presence or absence of indicia elements at the intersections of a rectangular coordinate grid for at least one region of the document.

3. The method of claim 2, including the step of reading out at least a portion of the stored processed data signals;
    reading out at least a portion of said stored scan spot data signals; and
    utilizing said read-out signals to produce a representation of the information defined by the processed data signals and to produce an image representative of the stored unprocessed indicia.

4. The method of claim 3, wherein said read-out scan spot data signals are utilized by directly them to a dot-matrix printer; and
    operating said printer to develop said image.

5. The method of processing a document carrying first and second sets of indicia, one of said sets including alphanumeric characters;
    said method comprising the steps of:
    scanning a region of the document encompassing both said first and second sets of indicia;
    producing binary scan spot data signals constituting a rectilinear data array of binary signals representing the presence or absence of character-or-other-indicia elements at the intersections of a rectangular coordinate grid for said region;
    processing in a predetermined manner the scan data signals representing one of said sets of indicia to produce processed data signals representing information related to a subject of the other of said sets of indicia;
    storing said processed data signals for said one set of indicia for subsequent read-out; and
    storing the scan spot data signals representing said other set of indicia for subsequent direct read-out as reproductions of the geometric shapes of said other set of indicia, the storage of said scan spot data signals preserving the rectilinear data array character of the original indicia and being arranged to permit said direct read-out to present said geometric shapes as a reproduction of the original geometric shapes thereof so as to accommodate visual identification of the information represented thereby.

6. The method of processing a document carrying two different sets of information-bearing indicia;
    said method comprising the steps of:
    scanning the document to produce binary scan spot data signals representing the presence or absence of indicia elements at closely-spaced and uniformly-spaced points on the document;
    processing the scan spot data signals representing one of said sets of indicia to produce corresponding processed data signals;
    said processed data signals and at least a portion of said scan spot data signals being stored so as to provide that (1) the processed data signals can be read out and (2) at least said portion of said stored scan spot data signals can be read out to produce an image reproduction of unprocessed indicia.

7. The method of processing a document carrying first and second sets of indicia, one of said sets including alphanumeric characters;
    said method comprising the steps of:
    scanning a region of the document encompassing both said first and second sets of indicia;
    producing binary scan spot data signals constituting a rectilinear data array of binary signals representing the presence or absence of character-or-other-indicia elements at the intersections of a rectangular coordinate grid for said region;
    processing in a predetermined manner the scan data signals representing one of said sets of indicia to produce processed data signals corresponding to said one set of indicia; and
    storing the scan spot data signals representing said other set of indicia for subsequent direct read-out as reproductions of the geometric shapes of said other set of indicia, the storage of said scan spot data signals preserving the rectilinear data array character of the original indicia and being arranged to permit said direct read-out to present said geometric shapes as a reproduction of the original geometric shapes thereof so as to accommodate visual identification of the information represented thereby.

* * * * *